United States Patent [19]

Wagner et al.

[11] 3,852,298

[45] Dec. 3, 1974

[54] CERTAIN POLYSUBSTITUTED BENZOTHIAZOLES

[75] Inventors: Klaus Wagner, Cologne; Hans Scheinpflug; Paul-Ernst Frohberger, both of Leverkusen, all of Germany

[73] Assignee: Bayer Aktiengesellschaft, Leverkusen, Germany

[22] Filed: July 10, 1972

[21] Appl. No.: 270,391

[30] Foreign Application Priority Data

July 23, 1971 Germany............................ 2136923

[52] U.S. Cl.......... 260/304, 260/247.1, 260/293.57, 424/248, 424/267, 424/270

[51] Int. Cl............................................. C07d 91/44

[58] Field of Search............ 260/304, 247.1, 293.57

[56] References Cited

UNITED STATES PATENTS 3,691,186 9/1972 Wagner et al. ..................... 260/304

OTHER PUBLICATIONS

Lee et al., Chem. Abstracts, 76: 1/498p (1972).

*Primary Examiner*—Richard J. Gallagher

*Attorney, Agent, or Firm*—Burgess, Dinklage & Sprung

[57] ABSTRACT

Substituted benzthiazoles of the general formula

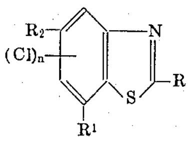

(I)

in which

R is CN or a radical of the formula

—CO—Z, $R^1$ is halogen, nitro, trifluoromethyl, trifluoromethoxy or a radical of the formula $—SO_2—Y,$ $R^2$ is hydrogen, halogen, trifluoromethyl, trifluoromethoxy, nitro, lower alkyl, CN or a radical or the formula

—CO—Z,

*n* is 0, 1 or 2, and

Y and Z each independently is hydrogen, alkyl, cycloalkyl or alkoxy with up to 6 carbon atoms, aralkyl or aryl, or a radical or the formula

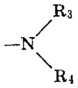

in which $R^3$ and $R^4$ each independently is hydrogen, alkyl or alkoxyalkyl with up to 12 carbon atoms, lower alkenyl, or phenylalkyl or phenyl wherein the phenyl may be substituted by chlorine, bromine, trifluoromethyl or methyl, or $R^3$ and $R^4$, together with the attached nitrogen atom, form a 5— or 6— membered heterocyclic ring, which possess fungicidal, bactericidal, insecticidal, acaricidal and algicidal properties.

7 Claims, No Drawings

CERTAIN POLYSUBSTITUTED BENZOTHIAZOLES

The present invention relates to and has for its objects the provision of particular new substituted benzthiazoles, i.e. 2-cyano-, -acyl-, -alkoxycarbonyl-or -aminocarbonyl-benzthiazoles which may be further substituted, which possess fungicidal bactericidal, insecticidal, acaricidal and algicidal properties, active compositions in the form of mixtures of such compounds with solids and liquid dispersible carrier vehicles, and methods for producing such compounds and for using such compounds in a new way especially for combating pests, e.g., fungi, bacteria, insects, acarids and algae, especially fungi and bacteria, with other and further objects becoming apparent from a study of the within specification and accompanying examples.

It has long been known to use zinc ethylene-1,2-bis-dithiocarbamate (Compound A) and N-trichloromethyl-thiotetrahydrophthalimide (Compound B) as fungicides in agriculture (including horticulture); these compounds are important commercial products (cf. R. Wegler, "Chemie der Pflanzenschutz- und Schadlingsbekampfungsmittel," Volume 2, pages 65 and 108, Berlin/Heidelberg/New York (1970)). The activity in the case of low applied concentrations, however, is not always satisfactory.

The present invention provides substituted benzthiazoles of the general formula

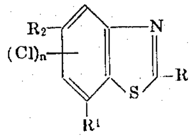

(I)

in which

R is CN or a radical of the formula $$-CO-Z,$$

$R^1$ is halogen, nitro, trifluoromethyl, trifluoromethoxy or a radical of the formula $$-SO_2-Y,$$

$R^2$ is hydrogen, halogen, trifluoromethyl, trifluoromethoxy, nitro, lower alkyl, CN or a radical of the formula $$-CO-Z,$$

*n* is 0, 1 or 2, and

Y and Z each independently is hydrogen, alkyl, cycloalkyl or alkoxy with up to 6 carbon atoms, aralkyl or aryl, or a radical of the formula

in which $R^3$ and $R^4$ each independently is hydrogen, alkyl or alkoxyalkyl with up to 12 carbon atoms, lower alkenyl, or phenylalkyl or phenyl wherein the phenyl may be substituted by chlorine, bromine, trifluoromethyl or methyl, or $R^3$ and $R^4$, together with the attached nitrogen atom, form a 5- or 6-membered heterocyclic ring.

Preferably, $R^1$ is chlorine, bromine, nitro, trifluoromethyl or $-SO_2-Y$; $R^2$ is methyl, ethyl, chlorine, bromine, cyano, trifluoromethyl, nitro or -CO-Z; Y and Z each independently is lower alkyl or alkoxy with up to 4 carbon atoms, benzyl, phenyl or

in which $R^3$ and $R^4$ each independently is hydrogen, alkyl or cycloalkyl with up to 6 carbon atoms or one of $R^3$ and $R^4$ may be phenyl, or $R^3$ and $R^4$ together with the connecting nitrogen atom form a 5- or 6-membered heterocyclic ring which may additionally contain in the hetero ring oxygen, sulfer or an N1alkyl group, especially a pyrrolidine or piperidine or morpholine ring.

The invention also provides a process for the production of a substituted benzthiazole of the formula (I) in which a benzthiazole-N-oxide of the general formula

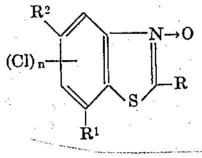

(II)

in which

R, $R^1$, $R^2$ and n have the meanings stated above, is reduced with either (a) a trivalent phosphorus compound of the general formula $$P(-R^5)_3 \quad (III)$$

in which $R^5$ stands for halogen, alkyl or alkoxy with up to 6 carbon atoms or aryl or aryloxy, or (b) with hydrogen.

Surprisingly, the substituted benzthiazoles according to the invention show a considerably higher fungicidal activity than the generally known commercial preparations mentioned above.

The new substances therefore represent an enrichment of the art.

If 2-ethoxycarbonyl-5-trifluoromethyl-7-nitrobenzthiazole-N-oxide and phosphorus trichloride are used as starting materials, the reaction course can be represented by the following formula scheme:

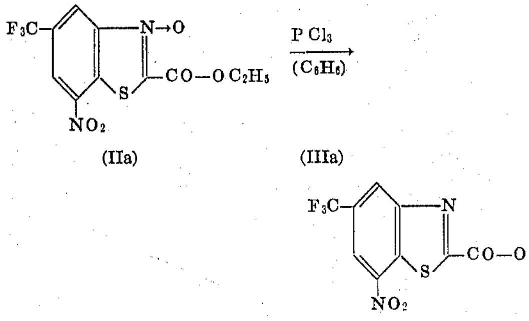

(IIa) (IIIa) (IV) (1)

Some of the benzthiazole-N-oxides required as starting materials, defined by the formula (II), and their preparation are known, e.g. German DOS 1,904,653; the compounds which are still new can be obtained in corresponding manner from 1-halogen-2-nitrobenzene derivatives and thioglycolic acid derivatives in water or an organic solvent, e.g. alcohol or benzene, in the presence of a base, e.g. triethylamine.

The trivalent phosphorus reducing agents, defined by the general formula (III), are generally known. In formula (III) $R^5$ preferably is chlorine, bromine, ethoxy, phenyl or phenoxy.

The process of the invention may be carried out in the presence of an inert diluent. As diluent, inert organic solvents are suitable. These include hydrocarbons, such as benzene, and chlorinated hydrocarbons, such as methylene chloride, chloroform, carbon tetrachloride and ethylene chloride.

The reaction temperatures can be varied within a fairly wide range. In general, the reaction is carried out at from about −20 to +100°C, preferably about 0° to 60°C.

When carrying out the process according to the invention, the benzthiazole-N-oxides may be provided in an inert solvent and reduction may be effected with approximately the equimolar amount of the reducing agent; the latter may often be used in excess, e.g. up to about 50 percent. Working up may take place by drawing off the solvent, washing the residue with water, and recrystallization from an appropriate solvent.

Those compounds of the formula (I) in which there is a chlorine atom in 4-position are preferably obtained from the correspondingly substituted benzthiazole-N-oxides by reaction with thionyl chloride at a temperature from about 20° to 160°C, preferably about 50° to 110°C as described in application Ser. No. 271,886 filed July 14, 1972.

The active compounds according to the invention exhibit a strong fungitoxic and bacteriotoxic activity. In the concentrations necessary for the control of fungi and bacteria, they generally do not damage cultivated plants and they have a low toxicity to warm-blooded animals. For these reasons they are suitable for use as crop protection agents for the control of fungi and bacteria. Fungitoxic agents in crop protection are used for the control of Archimycetes, Phycomycetes, Ascomycetes, Basidiomycetes and *Fungi Imperfecti*.

The active compounds according to the invention have a very broad activity spectrum and can be applied against parasitary fungi and bacteria which infect above-the-soil parts of plants or attack the plants from the soil, and seed-borne pathogenic agents.

The active compounds according to the invention have given especially good results in the control of rice diseases. Thus, they show an excellent activity against the fungus *Piricularia oryzae*.

The active compounds are likewise highly effective and of particular practical importance when they are used as seed dressings or soil treatment agents against phytopathogenic fungi which adhere to the seed or occur in the soil and cause, in cultivated plants, seedlings diseases, root rots, tracheomycoses, stem, stalk, leaf, blossom, fruit or seed diseases, such as *Tilletia caries*, *Helminthosporium gramineum*, *Fusarium nivale*, *Fusarium culmorum*, *Rhizoctonia solani*, *Phialophora cinerescens*, *Verticillium alboatrum*, *Fusarium dianthi*, *Fusarium cubense*, *Fusarium oxysporum*, *Fusarium solani*, *Sclerotinia sclerotiorum*, *Thielaviopsis basicola* and *Phytophthora cactorum*.

The active compounds according to the invention have e.g. also proved effective against *Pellicularia sasakii*, *Cochliobolus mivabeanus*, *Mycosphaerella musicola*, *Cercospora personata*, *Botrytis cinerea*, *Collectotrichum coffeanum* and *Alternaria species*. Bacteria species such as *Xanthomonas oryzae* can also be controlled.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes, (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, bactericides, insecticides, acaricides, and algicides, or rodenticides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

In the case of seed treatment, there are required, in general, amounts of active compound of about 0.1 to 10g, preferably about 0.5 to 5g, per kg of seed. For soil treatment, amounts of active compound of about 1 to 500g, preferably about 10 to 200 g, per cubic meter of soil are generally required.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. fungi, bacteria, insects, acarids and algae, and more particularly methods of combating at least one of fungi and bacteria, which comprises applying to at least one of correspondingly (a) such fungi, (b) such bacteria, (c) such insects, (d) such acarids, (e) such algae, and (f) the corresponding habitat thereof, i.e. the locus to be protected, a correspondingly combative or toxic amount, i.e. a fungicidally, bactericidally, insecticdally, acaricidally, or algicidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Mycelium growth test

| | |
|---|---|
| Nutrient medium used: | |
| 20 parts by weight agar-agar | 5 parts by weight peptone |
| 200 parts by weight potato decoction | 2 parts by weight $Na_2HPO_4$ |
| 5 parts by weight malt | 0.3 parts by weight $Ca(NO_3)_2$ |
| 15 parts by weight dextrose | |
| Proportion of solvent to nutrient medium: | |
| 2 parts by weight solvent mixture | |
| 100 parts by weight agar nutrient medium | |
| Composition solvent mixture | |
| 0.19 parts by weight dimethyl formamide | |
| 0.01 parts by weight alkanylpolyglycol ether | |
| 1.80 parts by weight water | |
| 2.00 parts by weight solvent mixture | |

The amount of active compound required for the desired concentration of active compound in the nutrient medium is mixed with the stated amount of solvent. The concentrate is thoroughly mixed in the stated proportion with the liquid nutrient medium which has been cooled to 42°C and is then poured into Petri dishes of 9 cm diameter. Control dishes to which the preparation has not been added are also set up.

When the nutrient medium has cooled and solidified, the dishes are inoculated with the species of fungi stated in the Table and incubated at about 21°C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

0 no fungus growth
1 very strong inhibition of growth
2 medium inhibition of growth
3 slight inhibition of growth
4 growth equal to that of untreated control.

The active compounds, their concentrations and the results obtained can be seen from Table 1:

TABLE 1
Mycelium growth test
| Active compounds | Concentration of active compound, p.p.m. | Fungi: Piricularia ryzae | Phialophora cinerescens | Pellicularia sasakii | Mycosphaerella musicola | Verticillium alboatrum | Fusarium dianthi | Cochliobolus miyabeanus | Collectotrichum coffeanum | Xanthomonas oryzae |
|---|---|---|---|---|---|---|---|---|---|---|
| A... 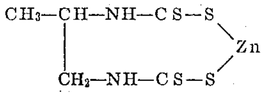 (known). | 10 | 0 | 4 | 3 | 1 | 4 | 4 | 4 | 4 | 4 |
| 26... 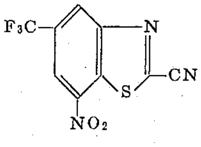 | 10 | 0 | 1 | --- | 0 | 0 | --- | 3 | 0 | --- |
| 28... 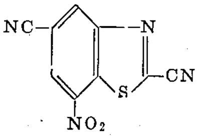 | 10 | 0 | 0 | --- | 0 | 0 | --- | 0 | 0 | --- |
| 27... 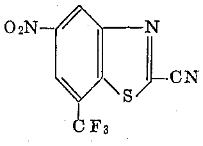 | 10 | 0 | 0 | 3 | 0 | 0 | 0 | 0 | 0 | --- |
| 33... 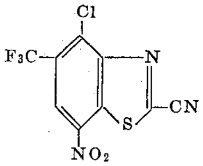 | 10 | 0 | 0 | --- | 0 | 0 | 3 | 0 | 0 | --- |
| 29... 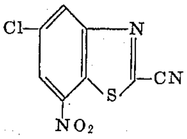 | 10 | 0 | 0 | 3 | 0 | 0 | 0 | 3 | 0 | --- |
| 35... 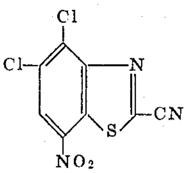 | 10 | 0 | 0 | 3 | 0 | 0 | 0 | 0 | 0 | 1 |
| 25... 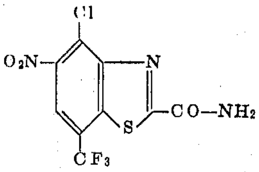 | 10 | 0 | 1 | --- | 1 | --- | --- | 3 | 0 | --- |
| 39... 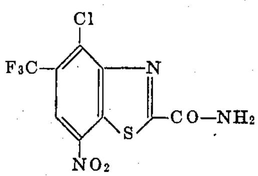 | 10 | 0 | --- | --- | 0 | --- | 3 | --- | 0 | --- |
| 18... 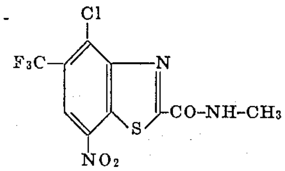 | 10 | 0 | --- | 3 | 0 | --- | --- | --- | 0 | --- |

EXAMPLE 2

Agar plate test

Test for fungitoxic effectiveness and breadth of the activity spectrum.

Solvent: Acetone

Parts by weight: a) 1000 b) 100

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm diameter. The Petri dishes remain at 20°C for 3 days for incubation.

After this time, the inhibiting action of the active compound on the mycelium growth is determined in categories, taking into account the untreated control. 0 means no mycelium growth, either on the treated substrate or on the inoculum; the symbol - means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table:

TABLE 2

Agar plate test

| | Active compound | Concentration of active compound in the substrate in mg./litre | *Corticium rolfsii* | *Sclerotinia sclerotiorum* | *Thielaviopsis basicola* | *Phytophthora cactorum* | *Fusarium culmorum* | *Fusarium oxysporum* | *Fusarium solani f. pisi* |
|---|---|---|---|---|---|---|---|---|---|
| | Untreated | | + | + | + | + | + | + | + |
| A | 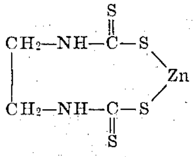 (known). | (a) 10 | + | + | + | + | + | + | + |
| | | (b) 100 | 0 | + | + | 0 | − | 0 | + |
| 26 | 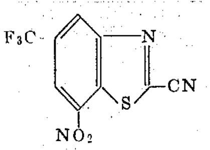 | (a) 10 | 0 | + | + | 0 | + | + | + |
| | | (b) 100 | 0 | 0 | 0 | 0 | 0 | 0 | 0 |
| 28 | 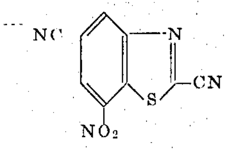 | (a) 10 | 0 | + | − | 0 | + | + | + |
| | | (b) 100 | 0 | 0 | 0 | 0 | 0 | 0 | 0 |
| 27 | 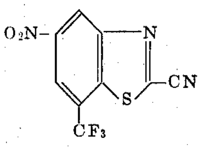 | (a) 10 | 0 | 0 | 0 | 0 | 0 | 0 | 0 |
| | | (b) 100 | 0 | 0 | 0 | 0 | 0 | 0 | 0 |
| 33 | 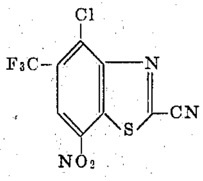 | (a) 10 | 0 | 0 | − | 0 | − | 0 | − |
| | | (b) 100 | 0 | 0 | − | 0 | − | 0 | − |
| 29 | 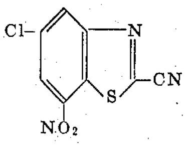 | (a) 10 | 0 | + | + | − | + | 0 | 0 |
| | | (b) 100 | 0 | − | + | − | + | 0 | 0 |

TABLE 2—Continued

| Active compound | | Concentration of active compound in the substrate in mg./litre | Corticium rolfsii | Sclerotinia sclerotiorum | Thielaviopsis basicola | Phytophthora cactorum | Fusarium culmorum | Fusarium oxysporum | Fusarium solani f. pisi |
|---|---|---|---|---|---|---|---|---|---|
| 35 | 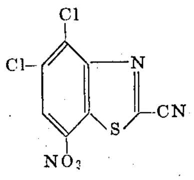 | (a) 10 | 0 | 0 | – | 0 | – | 0 | + |
| | | (b) 100 | 0 | 0 | – | 0 | 0 | 0 | + |
| 34 | 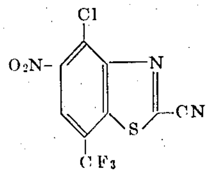 | (a) 10 | – | – | 0 | 0 | – | 0 | – |
| | | (b) 100 | 0 | 0 | 0 | 0 | 0 | 0 | 0 |
| 30 | 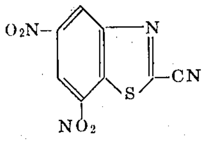 | (a) 10 | 0 | + | – | + | + | + | + |
| | | (b) 100 | 0 | 0 | 0 | 0 | – | 0 | 0 |
| 31 | 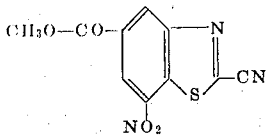 | (a) 10 | 0 | – | + | – | + | + | + |
| | | (b) 100 | 0 | 0 | 0 | 0 | – | 0 | 0 |
| 32 | 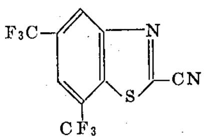 | (a) 10 | 0 | 0 | + | – | + | + | + |
| | | (b) 100 | 0 | 0 | – | 0 | 0 | 0 | 0 |
| 25 | 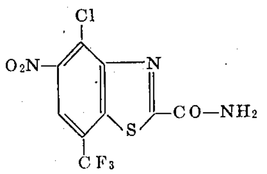 | (a) 10 | – | + | + | – | + | + | + |
| | | (b) 100 | 0 | – | – | – | – | – | – |

EXAMPLE 3

| | |
|---|---|
| Piricularia test: | liquid preparation of active compound |
| Solvent: | 1.9 parts by weight DMF |
| Dispersing agent: | 0.1 part by weight |
| Water: | 98 parts by weight water |

The amount of active compound required for the desired concentration in the spray liquor is mixed with the stated amount of solvent, and the concentrate is diluted with the stated amount of water containing the stated dispersing agent.

30 rice plants about 14 days old are sprayed with the spray liquor until dripping wet. The plants remain in a greenhouse at temperatures of 22° to 24°C and a relative atmospheric humidity of about 70% until they are dry. They are then inoculated with an aqueous suspension of 100,000 to 200,000 spores/ml of Piricularia oryzae and placed in a chamber at 24–26°C and 100% relative atmospheric humidity.

5 days after inoculation, the infection of all the leaves present at the time of inoculation is determined as a percentage of the untreated but also inoculated control plants. 0% means no infection; 100% means that the infection is exactly as great in the case of the control plants.

The active compounds, the concentrations of the active compounds and the results can be seen from the following Table:

TABLE 3

Piricularia test/liquid preparation of active compound

| Active compound | Infection as a percentage of the infection of the untreated control with a concentration of active compound (in percent) of— 0.05 | 0.025 |
|---|---|---|
| B 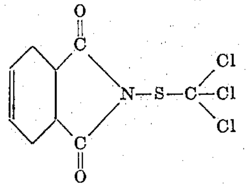 (known). | 75 | 100 |
| 33 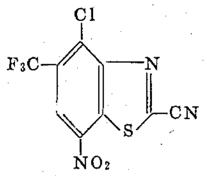 | 0 | 0 |
| 35 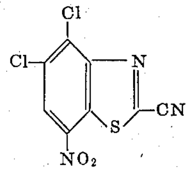 | 0 | 0 |
| 34 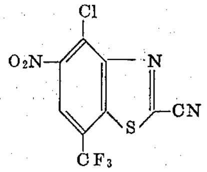 | 0 | 0 |
| 38 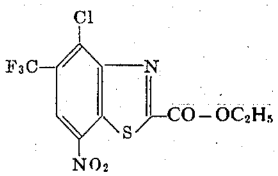 | 0 | 0 |

EXAMPLE 4

Bacteria test: Xanthomonas oryzae

| | |
|---|---|
| Solvent: | 1.9 parts by weight dimethyl formamide |
| Dispersing agent: | 0.1 part by weight alkylarylpolyglycol ether |
| Water: | 98 parts by weight |

The amount of active compound necessary for the desired concentration of active compound in the spray liquor is mixed with the stated amount of the solvent and of the dispersing agent, and the concentrate is diluted with the stated amount of water.

30 rice plants about 30 days old are sprayed with the spray liquor until dripping wet. The plants remain in a greenhouse at temperatures of 22° to 24°C and a relative atmospheric humidity of about 70% until they are dry. Needles are then dipped into an aqueous bacterial suspension of *Xanthomonas oryzae* and the plants are inoculated by pricking the leaves. After inoculation, the plants stand in a chamber of 26° to 28°C and 80% relative atmospheric humidity.

10 days after inoculation, the infection in the case of all the leaves injured by pricking, inoculated and previously treated with the preparation is determined as a percentage of the untreated but likewise inoculated leaves of the control plants. 0% denotes no infection; 100% means that the infection is exactly as great as in the case of the control plants.

The active compounds, the concentrations of active compound and the results can be seen from the following Table:

TABLE 4

Bacteria test/*Xanthomonas Oryzae*

| Active compound | Infection as a percentage of the infection of the untreated control with a concentration of active compound (in percent) of— 0.05 | 0.025 |
|---|---|---|
| 10 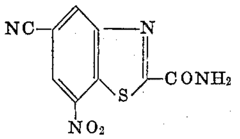 | 25 | 33 |
| 23 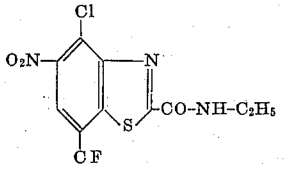 | 26 | ---------- |
| 33 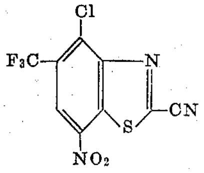 | 50 | ---------- |
| 34 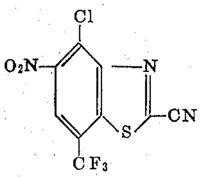 | 13 | 25 |
| 12 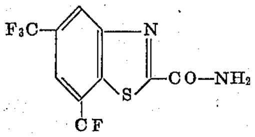 | 38 | 50 |

EXAMPLE 5

Seed dressing test/bunt of wheat (seed-borne mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g of the chlamydospores of *Tilletia tritici* per kg of seed. To apply the dressing, the seed is shaken with the dressing in a closed glass flask. The seed, on moist loam under a cover of a layer of muslin and 2 cm of moderately moist compost soil, is exposed to optimum germination conditions for the spores for 10 days at 10°C in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table:

TABLE 5
Seed dressing test/bunt of wheat

| | Active compounds | Concentration of active compound in the dressing in percent by weight | Applied amount of dressing in g./kg. seed | Spore germination in percent |
|---|---|---|---|---|
| | Non-dressed | | | >10 |
| A | 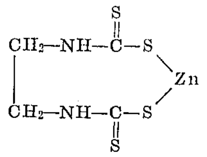 (known). | 10 | 1 | 5 |
| 28 | 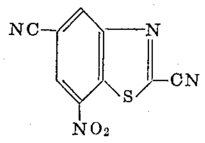 | 3<br>10<br>30 | 1<br>1<br>1 | 0.05<br>0.005<br>0.000 |
| 27 | 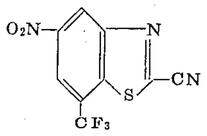 | 10<br>30 | 1<br>1 | 0.5<br>0.005 |
| 29 | 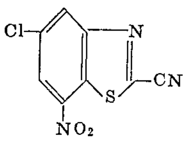 | 10<br>30 | 1<br>1 | 0.005<br>0.000 |
| 35 | 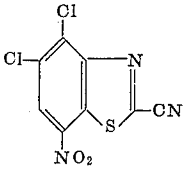 | 10<br>30 | 1<br>1 | 0.005<br>0.000 |
| 34 | 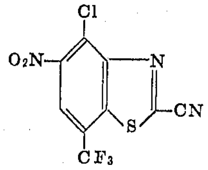 | 30 | 1 | 0.000 |
| 30 | 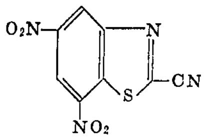 | 10<br>30 | 1<br>1 | 0.05<br>0.005 |
| 31 | 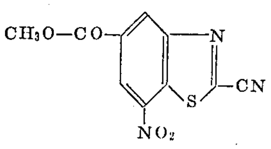 | 10<br>30 | 1<br>1 | 0.005<br>0.000 |
| 25 | 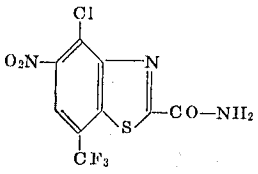 | 30 | 1 | 0.000 |

The following further examples are set forth to illustrate, without limitation, the process for producing the active compounds according to the present invention.

EXAMPLE 6

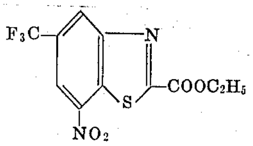

(1)

336g (1 mole) of 2-ethoxycarbonyl-5-trifluoromethyl-7-nitrobenzthiazole-N-oxide are dissolved in 1200 ml of chloroform. To the clear solution there are added dropwise, with stirring, 100 ml (about 157g or 1.14 moles) of phosphorus trichloride, the temperature of the reaction mixture being kept at 20 to 40°C by occasional ice cooling. After completion of dropwise addition, the reaction mixture is stirred for 4 hours at room temperature and the chloroform is subsequently distilled off in a vacuum. The oil remaining behind is made to crystallize by cooling and seeding. The product is washed neutral with water and, for further purification, recrystallized from cyclohexane. 245g of 2-ethoxycarbonyl-5-trifluoromethyl-7-nitrobenzthiazole are obtained in the form of light-yellow needles of the melting point 75° – 76°C.
Yield: 76% of theory.

The following compounds were also prepared in similar manner:

2.....
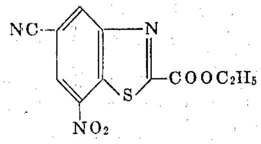
M.P. 137-138° C.

3.....
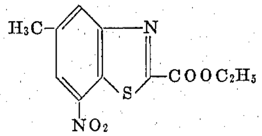
M.P. 154-156° C.

4.....
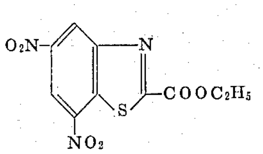
Oil, $n_D^{20}$:1.5498; M.P. 35-37° C.

5.....
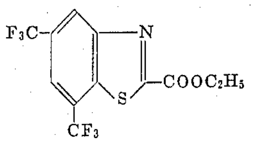
B.P. 108-110° C./0.1 mm. M.P. 44-45° C.

6.....
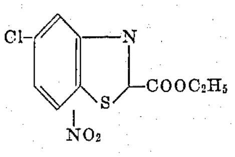
M.P. 89-90° C.

7.....
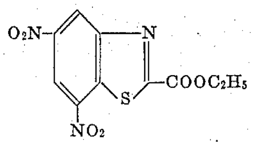
M.P. 102-104° C.

8.....
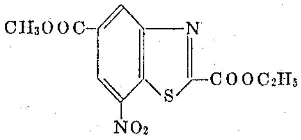
M.P. 114-116° C.

9.....
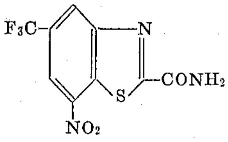
M.P. 225-226° C.

10.....
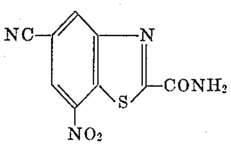
M.P. 268-270° C.

11.....
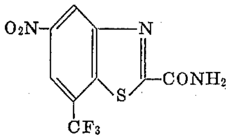
M.P. 197-199° C.

12.....
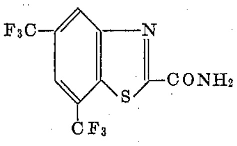
M.P. 131-132° C.

13.....
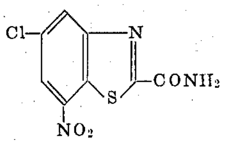
M.P. 229° C.

14.....
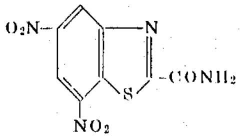
M.P. 227-230° C.

15.....
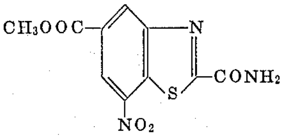
M.P. 248-250° C.

16.....
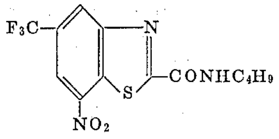
M.P. 102-103° C.

17.....
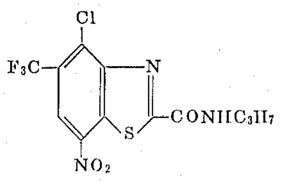
M.P. 148-150° C.

18.....
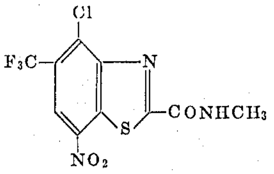
M.P. 163-165° C.

19.....
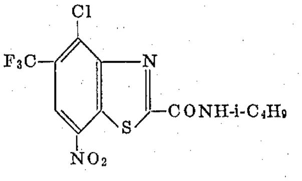
M.P. 93-95° C.

20.... 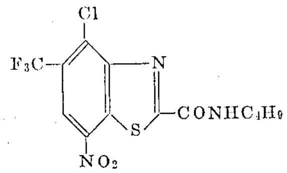 M.P. 158–159° C.
21.... 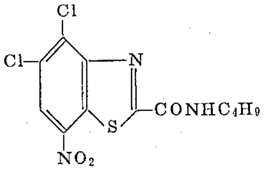 M.P. 172–173° C.
22.... 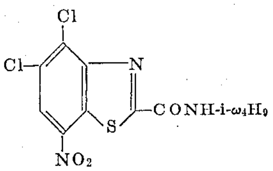 M.P. 148–149° C.
23.... 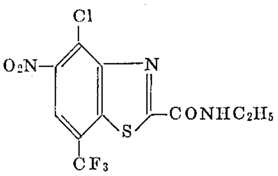 M.P. 160–162° C.
24.... 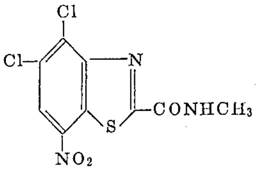 M.P. 238–240° C.
25.... 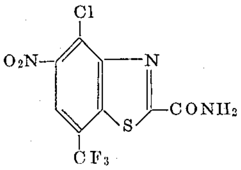 M.P. 206–207° C.
26.... 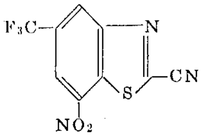 M.P. 93–94° C.
27.... 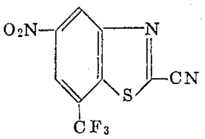 M.P. 86–88° C.
28.... 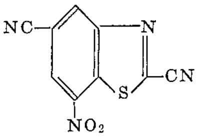 M.P. 179–180° C.
29.... 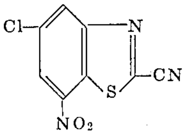 M.P. 148–150° C.
30.... 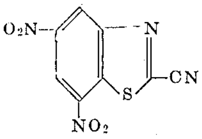 M.P. 142–144° C.
31.... 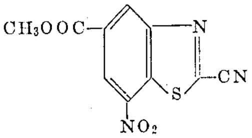 M.P. 136–138° C.
32.... 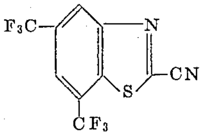 M.P. 45° C.
33.... 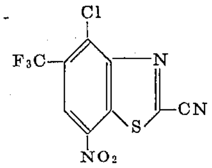 M.P. 127–129° C.
34.... 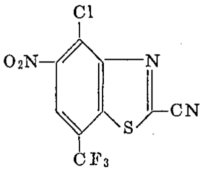 M.P. 95–96° C.
35.... 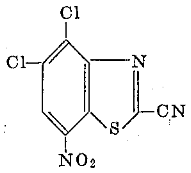 M.P. 155–157° C.
36.... 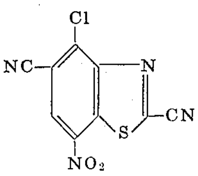 M.P. 207–209° C.
37.... 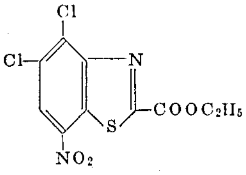 M.P. 195–197° C.
38.... 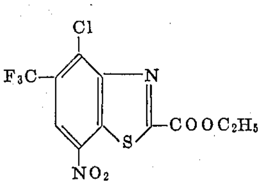 M.P. 99–100° C.
39.... 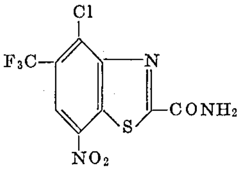 M.P. 208–209° C.
40.... 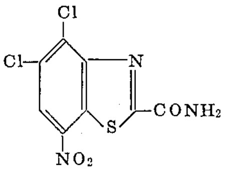 M.P. 295–297° C.

It will be appreciated that the instant specification and examples are set forth by way of illustration and not limitation, and that various modifications and changes may be made without departing from the spirit and scope of the present invention.

What is claimed is:

1. A substituted benzthiazole of the formula

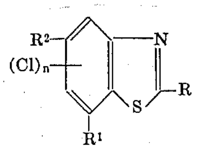

in which

R is CN or a radical of the formula

—CO—Z—, $R^1$ is halogen, nitro, trifluoromethyl, trifluoromethoxy or a radical of the formula $—SO_2—Y$, $R^2$ is hydrogen, halogen, trifluoromethyl, trifluoromethoxy, nitro, methyl, ethyl, CN or a radical of the formula

—CO—Z, $n$ is 0, 1 or 2, and

Y and Z each independently is hydrogen, alkyl, cycloalkyl or alkoxy with up to 6 carbon atoms, benzyl or phenyl, or a radical of the formula

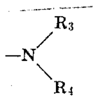

in which $R^3$ and $R^4$ each independently is hydrogen, alkyl or alkoxyalkyl with up to 12 carbon atoms, or phenylalkyl or phenyl wherein the phenyl may be substituted by chlorine, bromine, trifluoromethyl or methyl, or $R^3$ and $R^4$, together with the attached nitrogen atom, form a pyrrolidine, piperidine or morpholine ring.

2. A compound according to claim 1 in which $R^1$ is chlorine, bromine, nitro, trifluoromethyl or $—SO_2—Y$; $R^2$ is methyl, ethyl, chlorine, bromine, trifluoromethyl, nitro or —CO—Z; Y and Z each independently is lower alkyl with up to 4 carbon atoms, benzyl, phenyl or

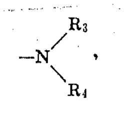

in which $R^3$ and $R^4$ each independently is hydrogen, alkyl or cycloalkyl with up to 6 carbon atoms or one of $R^3$ and $R^4$ may be phenyl, or $R^3$ and $R^4$ together with the connecting nitrogen atom form a pyrrolidine, piperidine or morpholine ring.

3. A compound according to claim 1 wherein such compound is 2-cyano-5-nitro-7-trifluoromethylbenzthiazole of the formula

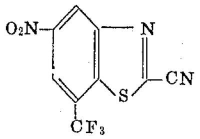

(27)

4. A compound according to claim 1 wherein such compound is 2,5-dicyano-7-nitrobenzthiazole of the formula

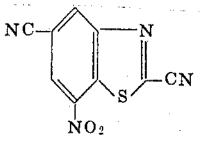

(28)

5. A compound according to claim 1 wherein such compound is 2-cyano-5-chloro-7-nitrobenzthiazole of the formula

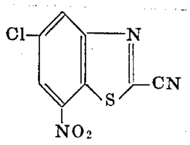

(29)

6. A compound according to claim 1 wherein such compound is 2-cyano-4-chloro-5-nitro-7-trifluorobenzthiazole of the formula

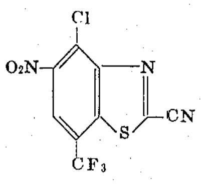

(34)

7. A compound according to claim 1 wherein such compound is 2-cyano-4,5-dichloro-7-nitrobenzthiazole of the formula

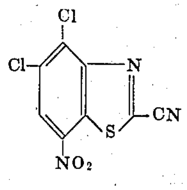

(35)

* * * * *